United States Patent
Jackson

(10) Patent No.: US 7,844,616 B2
(45) Date of Patent: Nov. 30, 2010

(54) METHOD, SYSTEM, AND PROGRAM PRODUCT FOR DISCOVERING RELEVANT INFORMATION IN A DYNAMIC INFORMATION SYSTEM

(75) Inventor: James Ernest Jackson, Wamboin (AU)

(73) Assignee: International Business Machines Corporation, Armonk, NY (US)

( * ) Notice: Subject to any disclaimer, the term of this patent is extended or adjusted under 35 U.S.C. 154(b) by 348 days.

(21) Appl. No.: 11/668,612

(22) Filed: Jan. 30, 2007

(65) Prior Publication Data

US 2008/0183692 A1 Jul. 31, 2008

(51) Int. Cl.
*G06F 17/30* (2006.01)
(52) U.S. Cl. .................... 707/758; 707/706
(58) Field of Classification Search ............ None
See application file for complete search history.

(56) References Cited

U.S. PATENT DOCUMENTS

| | | | |
|---|---|---|---|
| 5,467,268 A | 11/1995 | Sisley et al. | |
| 5,590,269 A | 12/1996 | Kruse et al. | |
| 5,623,404 A | 4/1997 | Collins et al. | |
| 6,216,098 B1 | 4/2001 | Clancey et al. | |
| 6,263,335 B1 | 7/2001 | Paik et al. | |
| 7,328,216 B2 | 2/2008 | Hofmann et al. | |
| 2001/0034708 A1* | 10/2001 | Walker et al. | 705/51 |
| 2002/0072947 A1* | 6/2002 | Nakamura | 705/8 |
| 2002/0138624 A1* | 9/2002 | Esenther | 709/227 |
| 2003/0018646 A1 | 1/2003 | Ohta et al. | |
| 2003/0208459 A1* | 11/2003 | Shea et al. | 707/1 |
| 2004/0158455 A1 | 8/2004 | Spivack et al. | |
| 2005/0075914 A1 | 4/2005 | Bayne | |
| 2005/0256735 A1 | 11/2005 | Bayne | |
| 2006/0271520 A1* | 11/2006 | Ragan | 707/3 |
| 2008/0177756 A1 | 7/2008 | Kosche et al. | |

FOREIGN PATENT DOCUMENTS

JP 2002312375 A 10/2005

OTHER PUBLICATIONS

Farkas et al. "Anonymity and Accountability in Self-Organizing Electronic Communities", WPES'02, Nov. 21, 2002, pp. 81-89.*
Akhras, F.N., Melnikoff, S.S.S., "Towards Dynamic Generation of Knowledge-Based Environments for Software Process Assistance", Proceedings. IEEE Fourth International Conference on Software Engineering and Knowledge Engineering, 1992, pp. 79-86.
Aksit, M.; Marcelloni, F.; Tekinerdogan, B.; van den Berg, K.; van den Broek, P., "Active Software Artifacts", Object-Oriented Technology, ECOOP'97 Workshop Reader. ECOOP'97 Workshops Proceedings, 1998, pp. 307-310.

(Continued)

*Primary Examiner*—Mohammad Ali
*Assistant Examiner*—Syed H Hasan
(74) *Attorney, Agent, or Firm*—Ronald A. Kaschak; Hoffman Warnick LLC

(57) ABSTRACT

The invention provides a method, system, and program product for discovering relevant information in a dynamic information system (DIS). An illustrative method according to the invention includes comparing information provided by the user to information in a network, determining whether the network contains information relevant to the information provided by the user, and displaying to the user an object containing the relevant information.

15 Claims, 4 Drawing Sheets

OTHER PUBLICATIONS

Settimi, R. (School of Computer Science, Telecommunications, & Information Systems, DePaul Univ., Chicago, IL, USA); Cleland-Huang, J.; Ben Khadra, O; Mody, J.; Lukasik, W.; DePalma, C., "Supporting Software Evoloution Through Dynamically Retrieving Traces to UML Artifacts", Proceedings. IEEE 7th International Workshop on Principles of Software Evolution, 2004, pp. 49-54.

Novak et al., "Uncovering and Utilization of Tacit Knowledge in Heterogeneous Expert Communities", i-corn Zeitschrift fur Interaktive and Kooperative Medien, n3, 2003, pp. 18-26, Oldenbourg (Abstract only).

Kutler et al., "Space Technology Knowledge Capture", A Collection of Technical papers—1st Space Exploration Conference: Continuing the Voyage of Discovery, v2, 2005, pp. 826-834, American Institute of Aeronautics and Astronautics Inc., Reston, VA (Abstract only).

Woo et al., "Dynamic Knowledge Map: Resuing Experts' Tacit knowledge in the AEC Industry", Automation in Construction, v 13, n2, 2004, pp. 203-207, Elsevier (Abstract only).

Chea et al., "Healthcare Knowledge Acquisition: An Ontology-Based Approach Using the Extensible Markup Language (XML)", medical Infobahn for Europe proceedings of MIE2000 and GMDS2000, 2000, pp. 827-831 (Abstract only).

Hashmi et al., "An Intelligent Agent-Based Knowledge Broker for Enterprise-Wide Healthcare Knowledge Procurement", Proceedings of 15th IEEE Symposium on Computer-Based Medical Systems (CBMS 2002), 2002, pp. 173-178, IEEE Computer. Soc.

Numata et al., "Knowledge Discovery and Sharing in an Information System", ASEE Annual Conference and xposition, Conference Proceedings, 2005, pp. 713-716, IEEE.

Hayward, Peter, "Facilitating Foresight: Where the Foresight Function is Placed in Organizations," Source: http://www.metafuture.org/articlesbycolleagues/PeterHayward/Facilitating_Foresight.htm).

Taleb-Bendiab et al., "Model-Based Self-Managing Systems Engineering", 2005, Proceedings of the 16th International Workshop on Database and Expert Systems Applications (DEXA '05), IEEE Computer Society.

Bayne, Jay S., "A Software Architecture for Control of Value Production in Federated Systems", 2003, pp. 1-6, SCI2003.

The Object Management Group (OMG) / Unified Modeling Language (UML) Resource Page, pulled Feb. 28, 2007 from web site: http://www.omg.org/uml.

Wiener, "Cybernetics: Or Control and Communication in the Animal and Machine," pp. 10-11, 1948 and 1961, Copyright by the Massachusetts Institute of Technology, New York.

Stafford Beer, "Designing Freedom," 1995, pp. 42-45 and 78-79, Publisher John Wiley & Sons.

Stafford Beer, "Platform for Change," 1995, pp. 71 and 105-107, Published John Wiley & Sons.

Stafford Beer, "The Heart of Enterprise," 1995, pp. 236-237, 252-253, 262-263 and 318-319, Publisher John Wiley & Sons.

Stafford Beer, "Brain of the Firm," 1995, pp. 130-131, 156-157 and 162-165, Publisher John Wiley & Sons.

Walter A. Shewhart, "Statistical Method from the Viewpoint of Quality Control," 1986, pp. 110-111 and 114-115, Dover Publications.

PCT Notification of Transmittal of the International Search Report and the Written Opinion of the International Searching Authority, PCT/EP2008/050344, Feb. 5, 2008.

Sum-Im, "Economic Dispatch by Ant Colony Search Algorithm", Dec. 1-3, 2004, pp. 416-421, Proceedings of the 2004 IEEE, Conference on Cybernetics and Intelligent Systems, Singapore.

Jackson, U.S. Appl. No. 11/668,564, filed Jan. 30, 2007, Office Action dated Apr. 16, 2009, 36 pages.

Jackson, U.S. Appl. No. 11/668,535, filed Jan. 30, 2007, Notice of Allowance and Fee(s) Due dated Aug. 20, 2009, 13 pages.

Jackson, U.S. Appl. No. 11/668,535, filed Jan. 30, 2007, Notice of Allowance and Fee(s) Due dated Nov. 3, 2009, 10 pages.

Jackson, U.S. Appl. No. 11/668,564, filed Jan. 30, 2007, Final Office Action dated Nov. 16, 2009, 35 pages.

\* cited by examiner

METHOD, SYSTEM, AND PROGRAM PRODUCT FOR DISCOVERING RELEVANT INFORMATION IN A DYNAMIC INFORMATION SYSTEM

CROSS-REFERENCE TO RELATED INVENTIONS

This invention is related to U.S. patent application Ser. No. 11/668,535 "DYNAMIC INFORMATION SYSTEMS", and U.S. patent application Ser. No. 11/668,564 entitled "METHOD, SYSTEM, AND PROGRAM PRODUCT FOR THE CREATION AND USE OF A UNIFIED DYNAMIC INFORMATION SYSTEM", both filed on even date herewith, assigned to the same assignee, and hereby incorporated herein by reference in their entirety.

FIELD OF THE INVENTION

The invention relates generally to dynamic information systems, and more particularly, to a method, system, and program product for discovering relevant information in a dynamic information system (DIS).

BACKGROUND OF THE INVENTION

Tacit knowledge is the detailed knowledge stored in a person's mind. It is a valuable asset in most organizations. Typically, as the size of an organization increases, the value to the organization of the tacit knowledge of its employees increases as well.

Despite its great value, organizations have historically been unable to fully or efficiently utilize the tacit knowledge of their employees. This is due, in part, to the very nature of tacit knowledge being both voluminous and highly differentiated. To date, approaches to utilizing tacit knowledge have involved manual processes, such as the designation and querying of known experts in a particular field, and computer software programs for entering, storing, and accessing tacit knowledge in a database, e.g., a knowledgebase. More recently, attempts to utilize tacit knowledge have included the automated scanning of electronic mail messages between an organizations employees.

Such approaches suffer from a number of deficiencies. For example, it may be unclear that one is even faced with a task or problem that may benefit from the tacit knowledge of another member of the organization. That is, one may not realize that another member of the organization has previously executed the same task or overcome the same problem. Knowledge of such may enable an individual to greatly simplify his/her execution of the task or solving of the problem and may also enable the individual to avoid mistakes made by others.

Even when an individual knows that he or she is faced with a particular problem, he or she may not be able to articulate the problem well enough to determine which members of the organization may have experience with the problem. For example, knowing that a computer program encounters errors when running on a particular network may not enable an individual to determine whether the error is the result of a software flaw, a hardware failure, or a network failure. As a result, it may be unclear whether he/she should seek help from individuals involved with writing the software, those responsible for installation and/or maintenance of the hardware, or a network administrator.

In addition, once an individual having experience with the particular problem is identified, the user may not be able to provide that individual sufficient context to enable the individual to provide guidance and/or a solution. For example, if it is determined that the error above is the result of a software flaw, the user may not be able to articulate to the individual all of the details (e.g., type of error, when error occurs, extent of error, etc.) necessary for that individual to accurately guide the user toward a solution.

Accordingly, there exists a need in the art to overcome the deficiencies and limitations described hereinabove.

SUMMARY OF THE INVENTION

The invention provides a method, system, and program product for discovering relevant information in a dynamic information system (DIS). An illustrative method according to the invention includes comparing information provided by the user to information in a network, determining whether the network contains information relevant to the information provided by the user, and displaying to the user an object containing the relevant information.

A first aspect of the invention provides a method for discovering relevant information in a dynamic information system (DIS), the method comprising: tracking information provided by a user of the DIS; comparing the information provided by the user to information in a network; determining whether the network contains information relevant to the information provided by the user; and in the case that it is determined that the network contains information relevant to the information provided by the user, displaying to the user an object containing the relevant information.

A second aspect of the invention provides a system for discovering relevant information in a dynamic information system (DIS), the system comprising: a first system for tracking information provided by a user of the DIS; a second system for comparing the information provided by the user to information in a network; a third system for determining whether the network contains information relevant to the information provided by the user; and a fourth system for displaying to the user an object containing the relevant information.

A third aspect of the invention provides a program product stored on a computer-readable medium, which when executed, is operable to discover relevant information in a dynamic information system (DIS), the program product comprising: program code for tracking information provided by a user of the DIS; program code for comparing the information provided by the user to information in a network; program code for determining whether the network contains information relevant to the information provided by the user; and program code for displaying to the user an object containing the relevant information.

A fourth aspect of the invention provides a method for deploying an application for discovering relevant information in a dynamic information system (DIS), comprising: providing a computer infrastructure being operable to: track information provided by a user of the DIS; compare the information provided by the user to information in a network; determine whether the network contains information relevant to the information provided by the user; and display to the user an object containing the relevant information.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
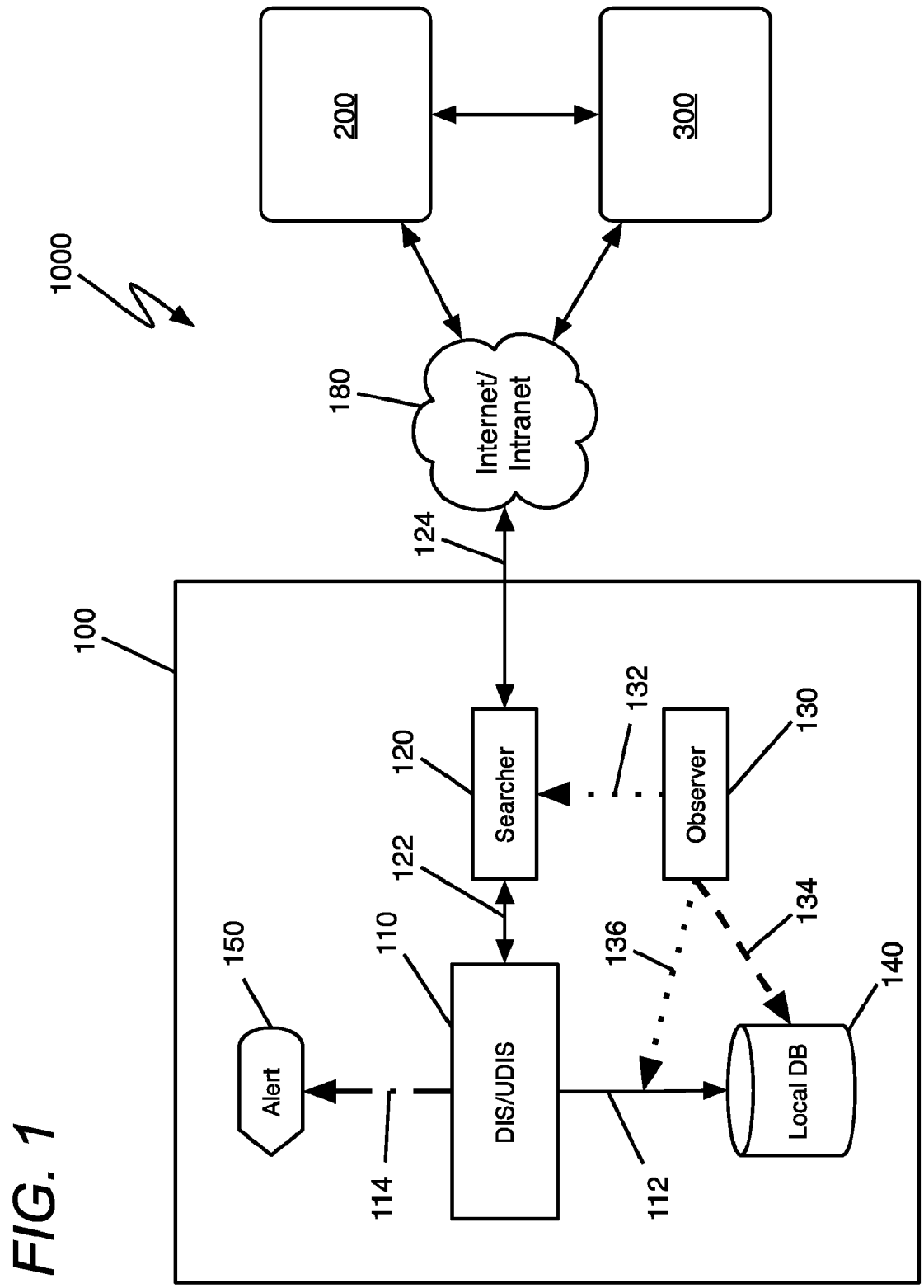
FIG. 1 shows an illustrative network according to the invention.

As indicated above, the invention provides a method, system, and program product for discovering relevant information in a dynamic information system (DIS). In one embodiment, the invention comprises a pair of computer software modules—a searcher module and an observer module—that can be embedded in a unified dynamic information system (UDIS) to automatically search the system for sources of tacit knowledge. A UDIS contains metadata related to both human processes and technology components within the meta-system of a DIS.

Because a UDIS embeds metadata within a DIS meta-system in an asymmetrical navigational form, and because the meta-metadata for the UDIS is also embedded, the present invention provides a number of advantages. First, within a specific metadata context, a user can seek other UDISs within his/her organization that include relevant information (e.g., a solution to a particular problem) and identify those individuals within the organization responsible for the entry and/or management of that information. In some embodiments, a system according to the invention may notify a user whether such an individual is available online or through some other communication medium.

Second, once such an individual is identified, he/she may be given access to the user's data in order to provide adequate context to provide advice or offer a solution to the user's particular problem or task. Such an individual may even provide examples from his/her UDIS that may help a user in completing his/her task or solving his/her problem.

Third, an observer module according to the invention may monitor a user's work and compare it to predefined rules and/or preexisting data in a UDIS and alert the user if his/her work is inconsistent with such rules and/or data. Thus, a user's work may be compared to similar work previously conducted by another individual in an organization in order to avoid the user's work deviating from the previous work. A system according to the invention may even request intervention by another member of the organization, in the case that a user's work is inconsistent with particular rules and/or data. Such comparisons against predefined rules and/or preexisting data may also be scheduled to occur at various points in a user's work. For example, such comparisons may be scheduled periodically (e.g., once per week) or at particular stages (e.g., at the end of a creation phase, following a major change, etc.).

Fourth, while the examples below generally depict the interaction of two or more UDISs within an organization, the present invention is equally applicable to universal description, discovery, and integration systems (UDDISs) between organizations. Thus, an organization may wish to collaborate with another organization by allowing their respective members to share information and resources as would members within each organization.

The advantages described above are simply a few of those offered by the present invention, the details of which will now be more fully described with respect to the drawings.

FIG. 1 shows a block diagram of an illustrative network 1000 according to the invention, the network 1000 including a plurality of DIS instances 100, 200, 300. Each DIS instance may function as will be described below with respect to DIS instance 100 and/or may interact with another DIS instance (e.g., 200, 300) via an Internet/Intranet connection 180 or other communication medium.

As shown in FIG. 1, DIS instance 100 includes a DIS or UDIS 110 and a local database 140. In addition, DIS instance 100 includes a searcher module 120 and an observer module 130. Observer module 130 is capable of comparing a change to the DIS or UDIS 110 made by the user with at least one of the following: a predefined rule and preexisting DIS or UDIS data, determining whether the user's change complies with at least one of the following: the predefined rule and the preexisting DIS or UDIS data. Observer module 130 is further capable of amending the predefined rule to comport with the user's change and/or notifying the user that the user's change does not comply with the predefined rule and/or amending the preexisting DIS data to comport with the user's change and/or notifying the user that the user's change does not comply with the preexisting DIS data.

Observer module 130 includes separate processing threads embedded in a meta-system of the DIS or UDIS 110, allowing comparison of metadata structures created by a user to corresponding canonical metadata structures in the DIS or UDIS 110. Thus, observer module 130 facilitates the tracking 136 of changes 112 to the DIS or UDIS 110 made by a user and/or the comparison 134 of such changes to predetermined rules within the DIS or UDIS 110, as stored in local database 140. As noted above, an alert 150 may be generated 114 to notify a user that his/her changes are inconsistent with predetermined rules and/or preexisting data in the DIS or UDIS 110. Observer module 130 is also operable to monitor 132 the function of searcher module 120, described below.

Searcher module 120 is capable of tracking information provided by a user of DIS or UDIS 110, comparing the information provided by the user to information in a network (e.g., network 1000), determining whether the network contains information relevant to the information provided by the user, and, in the case that it is determined that the network contains information relevant to the information provided by the user, displaying to the user an object containing the relevant information.

More specifically, searcher module 120 implements a search algorithm based upon traversal of a network of objects and relationships, e.g., DIS or UDIS 110. Preferably, such objects and relationships are capable of representation in extensible markup language (XML) or other format, such that a fragment of metadata from one DIS instance (e.g., 100) may be discovered in another DIS instance (e.g., 200, 300). Such searches may, therefore, be made locally 122 (i.e., within DIS or UDIS 110) or externally 124 (i.e., between DIS instances 100, 200, and 300 in network 1000).

Preferably, each object and relationship in the network is versioned, such that its status and authors/owners are known. This facilitates not only the exclusion of invalid or unreliable data from searches, but also the reporting of appropriate contacts to a user, along with whatever relevant information is discovered during the search.

For example, in assembling a plan for a computer network using DIS instance 100, a user may discover, using searcher module 120, that a plan for a similar computer network is contained in DIS instance 200. It may be desirable, however, to not only know of the existence of such a plan and have access to it, but also to know the identity of the author(s) or owner(s) of the plan, should the user desire to contact them for additional information or guidance. Network 1000 may, therefore, include a system for contacting such author(s) or owner(s) or, if preferred, requesting permission from such author(s) or owner(s) to release their identities to a user.

The present invention is applicable to virtually any type of stored information. While information technology (IT) applications may be more apparent, such as the assembly of a plan for a computer network described above, the present invention is not limited to such information. Any type of information stored in a database may be used in practicing the present invention.

Figure 2:
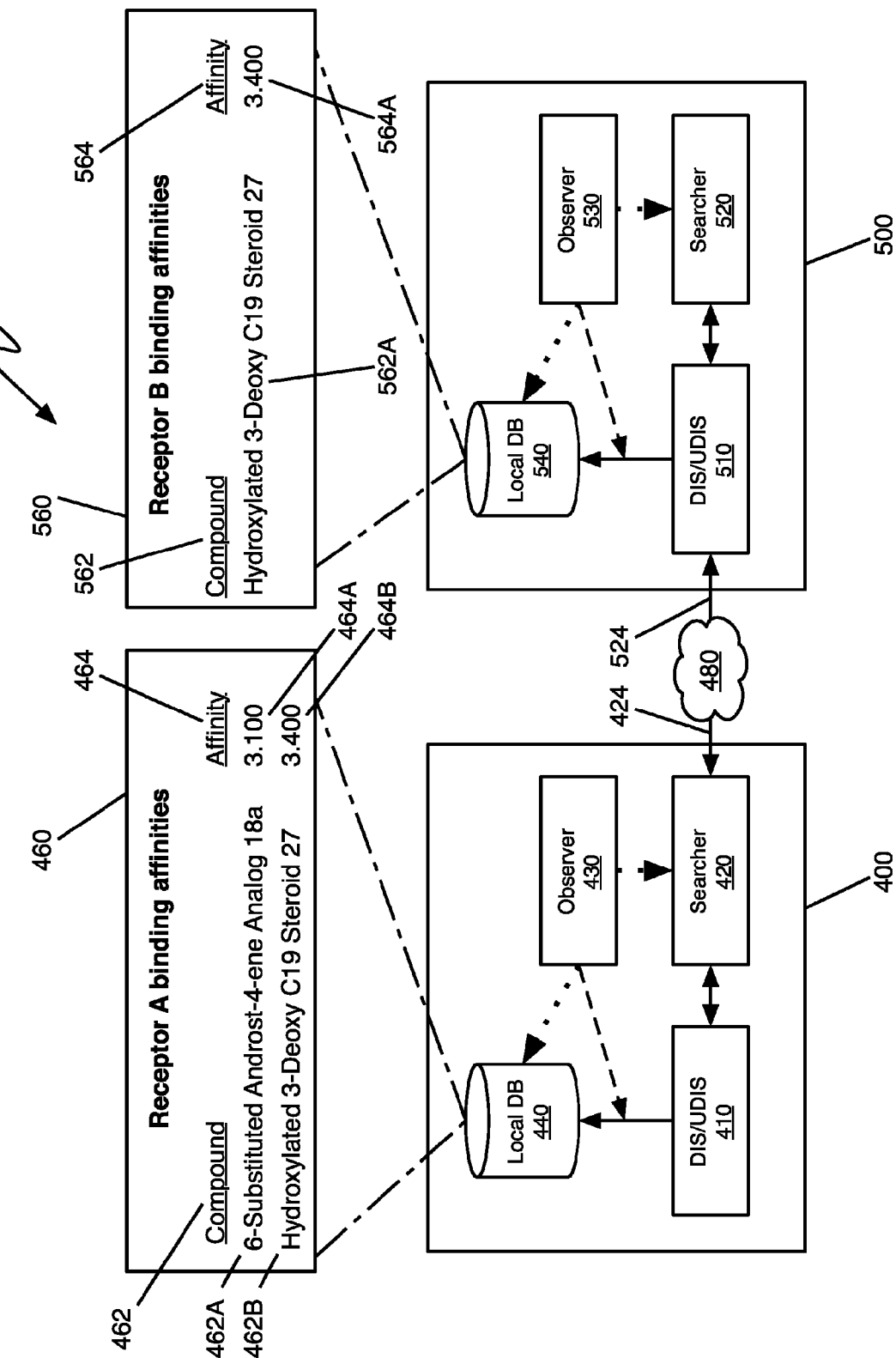
FIG. 2 shows an alternative illustrative network according to the invention.

For example, FIG. 2 shows a diagram of a non-IT application of the present invention. Network 2000 includes a pair of DIS instances 400, 500 communicating over an Internet/Intranet connection 480, as described above with respect to FIG. 1. DIS instance 400 is being used by a first biologist researching binding affinities for Receptor A. Table 460, stored in the local database 440 of DIS instance 400, includes a list of compounds 462 and their corresponding binding affinities 464 for Receptor A. As shown, the compound 6-Substituted Androst-4-ene Analog 18a 462A has a binding affinity 464A of 3.100 and the compound Hydroxylated 3-Deoxy C19 Steroid 27 462B has a binding affinity 464B of 3.400.

DIS instance 500 is being used by a second biologist researching binding affinities for Receptor B. Table 560, stored in the local database 540 of DIS instance 500, includes a list of compounds 562 and binding affinities 564, similar to that in table 460. Table 560 also includes the compound Hydroxylated 3-Deoxy C19 Steroid 27 562A and shows its binding affinity 564A for Receptor B to also be 3.400.

Thus, via searches 424, 524 between DIS instances 400, 500, one or both of the first and second biologist may discover that each is studying the same compound and/or that the compound has the same affinity for both Receptor A and Receptor B. By viewing the contents of table 460 and/or contacting the first biologist, it may occur to the second biologist, for example, that he/she should also test the binding affinity of 6-Substituted Androst-4-ene Analog 18a for Receptor B, given the similarity of affinities of Hydroxylated 3-Deoxy C19 Steroid 27 for both receptors. It may also occur to one or both biologists that Receptor A and Receptor B are, in fact, the same receptor and that their studies are duplicative. In such a case, greater efficiency and cost savings may be realized by either combining the research of the biologists or halting the studies of one of the biologists.

The non-IT example shown in FIG. 2 is merely illustrative and is in no way to be viewed as limiting the scope of the present invention. As noted above, any type of information stored in a database may be used in practicing the present invention.

Figure 3:
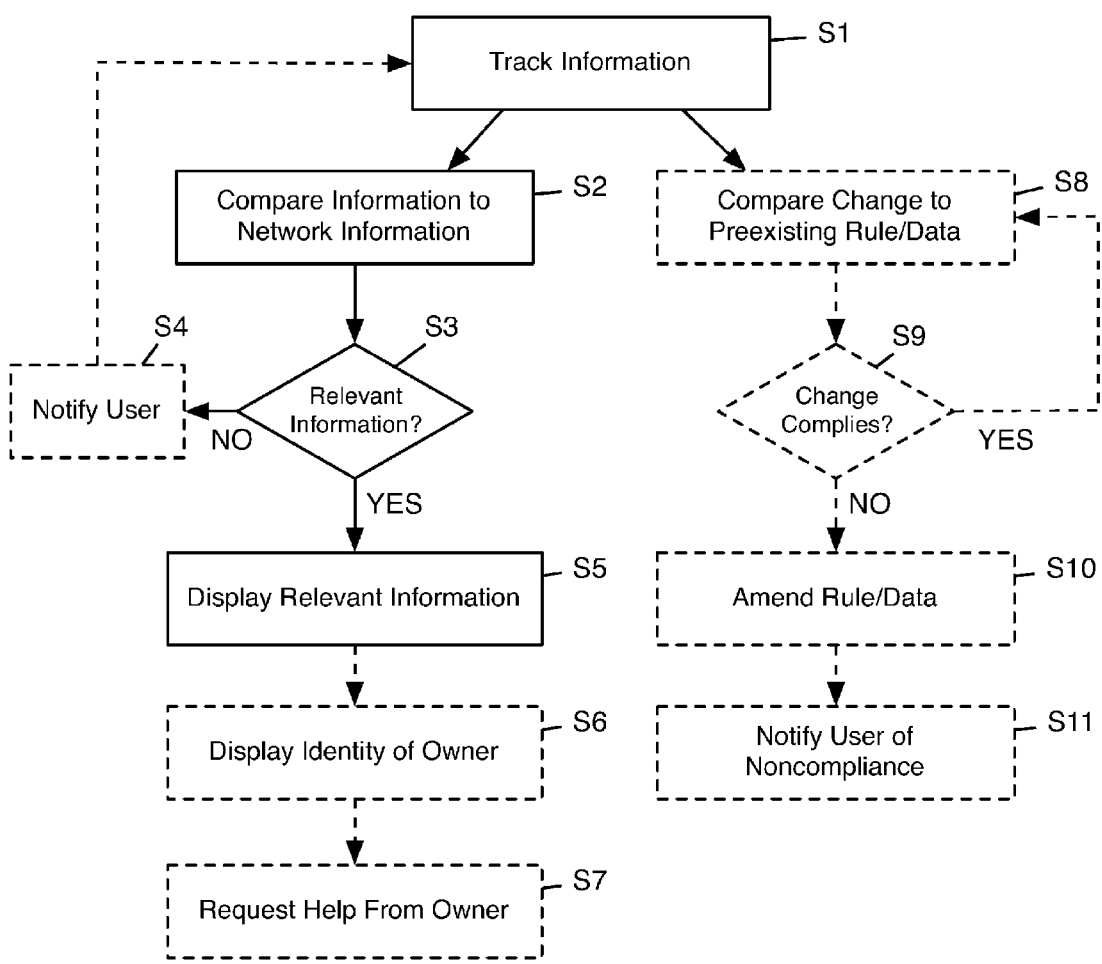
FIG. 3 shows a flow diagram of an illustrative method according to the invention.

FIG. 3 shows a flow diagram of an illustrative method according to the invention. At S1, searcher module 120 (FIG. 1) tracks information entered by a user into a DIS. At S2, the information tracked at S1 is compared to information available in the DIS or a network of DIS instances (e.g., network 1000 of FIG. 1).

At S3 it is determined whether information relevant to the information tracked at S1 is contained within the DIS or network of DIS instances. As explained above, this may be accomplished, for example, by searching metadata of the DIS or network of DIS instances using a search algorithm. If no relevant information is found (i.e., "NO" at S3), a user may optionally be notified of such at S4 and flow loop to S1. If relevant information is found (i.e., "YES" at S3), the relevant information and/or database objects containing the relevant information is displayed to the user at S5.

Optionally, an identity of an owner of the relevant information displayed at S5 may be displayed to the user at S6. In response, a user may optionally request help from the owner at S7.

At S8 through S11, a user's changes may optionally be compared to preexisting rules or data in a DIS and the user notified of any inconsistencies. At S8, a change to the DIS made by a user is compared to preexisting rules and/or preexisting data in the DIS. At S9, it is determined whether the user's change complies with the preexisting rules and/or preexisting data. If so (i.e., "YES" at S9), flow may be looped to S8 and additional changes compared. If not (i.e., "NO" at S9), the preexisting rule and/or preexisting data may be amended at S10 to comport with the user's change and/or the user may be notified at S11 of the change's noncompliance with a preexisting rule and/or preexisting data.

Figure 4:
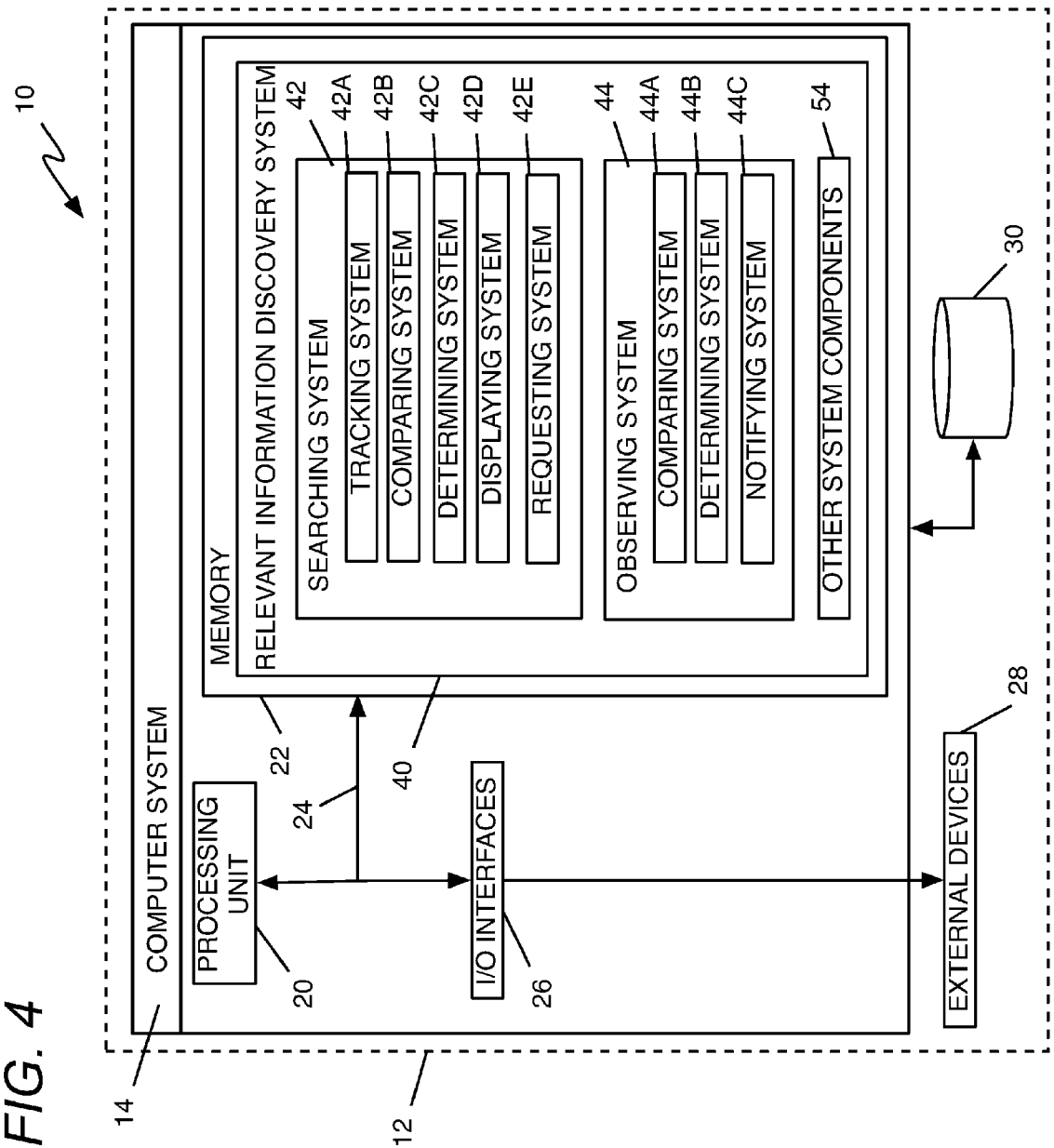
FIG. 4 shows a block diagram of an illustrative system according to the invention.

FIG. 4 shows an illustrative system 10 for discovering relevant information in a DIS. To this extent, system 10 includes a computer infrastructure 12 that can perform the various process steps described herein for discovering relevant information in a DIS. In particular, computer infrastructure 12 is shown including a computer system 14 that comprises a relevant information discovery system 40, which enables computer system 14 to discover relevant information in a DIS by performing the process steps of the invention.

Computer system 14 is shown including a processing unit 20, a memory 22, an input/output (I/O) interface 26, and a bus 24. Further, computer system 14 is shown in communication with external devices 28 and a storage system 30. As is known in the art, in general, processing unit 20 executes computer program code, such as relevant information discovery system 40, that is stored in memory 22 and/or storage system 30. While executing computer program code, processing unit 20 can read and/or write data from/to memory 22, storage system 30, and/or I/O interface 26. Bus 24 provides a communication link between each of the components in computer system 14. External devices 28 can comprise any device that enables a user (not shown) to interact with computer system 14 or any device that enables computer system 14 to communicate with one or more other computer systems.

In any event, computer system 14 can comprise any general purpose computing article of manufacture capable of executing computer program code installed by a user (e.g., a personal computer, server, handheld device, etc.). However, it is understood that computer system 14 and relevant information discovery system 40 are only representative of various possible computer systems that may perform the various process steps of the invention. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computer systems (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

As previously mentioned, relevant information discovery system 40 enables computer system 14 to discover relevant information in a DIS. To this extent, relevant information discovery system 40 is shown including a searching system 42 (comprising a tracking system 42A, a comparing system 42B, a determining system 42C, a displaying system 42D, and a requesting system 42E) and an observing system 44 (comprising a comparing system 44A, a determining system 44B, and a notifying system 44C). Operation of each of these systems is discussed above. Relevant information discovery system 40 may further include other system components 54 to provide additional or improved functionality to relevant information discovery system 40. It is understood that some of the various systems shown in FIG. 4 can be implemented independently, combined, and/or stored in memory for one or more separate computer systems 14 that communicate over a network. Further, it is understood that some of the systems and/or functionality may not be implemented, or additional systems and/or functionality may be included as part of system 10.

While shown and described herein as a method and system for discovering relevant information in a DIS, it is understood that the invention further provides various alternative embodiments. For example, in one embodiment, the invention provides a computer-readable medium that includes computer program code to enable a computer infrastructure to discover relevant information in a DIS. To this extent, the computer-readable medium includes program code, such as relevant information discovery system 40, that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as memory 22 and/or storage system 30 (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider could offer to discover relevant information in a DIS, as described above. In this case, the service provider can create, maintain, support, etc., a computer infrastructure, such as computer infrastructure 12, that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for discovering relevant information in a DIS. In this case, a computer infrastructure, such as computer infrastructure 12, can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computer system, such as computer system 14, from a computer-readable medium; (2) adding one or more computer systems to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for discovering relevant information in a dynamic information system (DIS), the method comprising:
    employing at least one computing device for:
        tracking information entered by a user of the DIS;
        determining for the user, based on the information entered by the user, an initial appropriate context within which to search for relevant information;
        searching for relevant information by:
            comparing, within the initial appropriate context, the information entered by the user to information in a network; and
            determining whether the network contains information relevant to the information entered by the user;
        in the case that it is determined that the network contains information relevant to the information entered by the user:
            displaying to the user an object containing the relevant information;
            seeking permission from an owner of the object to release his/her identity to the user; and
            in the case that permission from the owner is granted, displaying to the user the identity of the owner of the object;
        comparing a change to the DIS made by the user with at least one of the following: a predefined rule or preexisting DIS data;
        determining whether the user's change complies with at least one of the following: the predefined rule or the preexisting DIS data:
        in the case that the user's change does not comply with the predefined rule, performing one of the following:
            amending the predefined rule to comport with the user's change or notifying the user that the user's change does not comply with the predefined rule: and
in the case that the user's change does not comply with the preexisting DIS data, performing one of the following: amending the preexisting DIS data to comport with the user's change or notifying the user that the user's change does not comply with the preexisting DIS data.

2. The method of claim 1, wherein the DIS includes data, metadata, and rules stored in an asymmetrical navigational database.

3. The method of claim 2, wherein the data, metadata, and rules are capable of representation in extensible markup language (XML).

4. The method of claim 1, wherein the DIS comprises a unified dynamic information system (UDIS).

5. The method of claim 1, wherein the DIS comprises a universal description, discovery, and integration system (UDDIS).

6. The method of claim 1, further comprising:
providing the owner of the object with access to data from the user's DIS.

7. A system for discovering relevant information in a dynamic information system (DIS), the system comprising:
at least one computing device;
a system for tracking information entered by a user of the DIS;
a system for determining for the user, based on the information entered by the user, an initial appropriate context within which to search for relevant information;
a system for searching for relevant information by:
comparing, within the initial appropriate context, the information entered by the user to information in a network; and
determining whether the network contains information relevant to the information entered by the user;
a system for displaying to the user an object containing the relevant information;
a system for seeking permission from an owner of the object to release his/her identity to the user;
a system for displaying to the user the identity of the owner of the object;
a system for comparing a change to the DIS made by the user with at least one of the following: a predefined rule or preexisting DIS data;
a system for determining whether the user's change complies with at least one of the following: the predefined rule or the preexisting DIS data;
a system for performing at least one of the following: amending the predefined rule to comport with the user's change or notifying the user that the user's change does not comply with the predefined rule; and
a system for performing at least one of the following: amending the preexisting DIS data to comport with the user's change or notifying the user that the user's change does not comply with the preexisting DIS data.

8. The system of claim 7, wherein the DIS includes data, metadata, and rules stored in an asymmetrical navigational database and capable of representation in extensible markup language (XML).

9. The system of claim 7, wherein the DIS comprises at least one of the following: a unified dynamic information system (UDIS) and a universal description, discovery, and integration system (UDDIS).

10. The system of claim 7, further comprising:
a system for providing the owner of the object with access to data from the user's DIS.

11. A program product stored on a computer-readable storage medium, which when executed, is operable to discover relevant information in a dynamic information system (DIS), the program product comprising:
program code for tracking information entered by a user of the DIS;
program code for determining for the user, based on the information entered by the user, an initial appropriate context within which to search for relevant information;
program code for searching for relevant information by:
comparing, within the initial appropriate context, the information entered by the user to information in a network; and
determining whether the network contains information relevant to the information entered by the user;
program code for displaying to the user an object containing the relevant information;
program code for seeking permission from an owner of the object to release his/her identity to the user;
program code for displaying to the user the identity of the owner of the object;
program code for comparing a change to the DIS made by the user with at least one of the following: a predefined rule or preexisting DIS data;
program code for determining whether the user's change complies with at least one of the following: the predefined rule or the preexisting DIS data;
program code for performing at least one of the following: amending the predefined rule to comport with the user's change or notifying the user that the user's change does not comply with the predefined rule; and
program code for performing at least one of the following: amending the preexisting DIS data to comport with the user's change or notifying the user that the user's change does not comply with the preexisting DIS data.

12. The program product of claim 11, wherein the DIS includes data, metadata, and rules stored in an asymmetrical navigational database and capable of representation in extensible markup language (XML).

13. The program product of claim 11, wherein the DIS comprises at least one of the following: a unified dynamic information system (UDIS) and a universal description, discovery, and integration system (UDDIS).

14. The program product of claim 11, further comprising:
program code for providing the owner of the object with access to data from the user's DIS.

15. A method for deploying an application for discovering relevant information in a dynamic information system (DIS), comprising:
providing a computer infrastructure being operable to:
track information entered by a user of the DIS;
determine for the user, based on the information entered by the user, an initial appropriate context within which to search for relevant information;
search for relevant information by:
comparing the information entered by the user to information in a network; and
determining whether the network contains information relevant to the information entered by the user;
display to the user an object containing the relevant information;
seek permission from an owner of the object to release his/her identity to the user;
display to the user the identity of the owner of the object;
compare a change to the DIS made by the user with at least one of the following: a predefined rule or preexisting DIS data;

determine whether the user's change complies with at least one of the following: the predefined rule or the preexisting DIS data;

in the case that the user's change does not comply with the predefined rule, perform at least one of the following: amend the predefined rule to comport with the user's change or notify the user that the user's change does not comply with the predefined rule; and in the case that the user's change does not comply with the preexisting DIS data, perform at least one of the following: amend the preexisting DIS data to comport with the user's change or notify the user that the user's change does not comply with the preexisting DIS data.

* * * * *